July 24, 1934.  M. SALADOW  1,967,593
SHAVING BRUSH
Filed Nov. 29, 1932
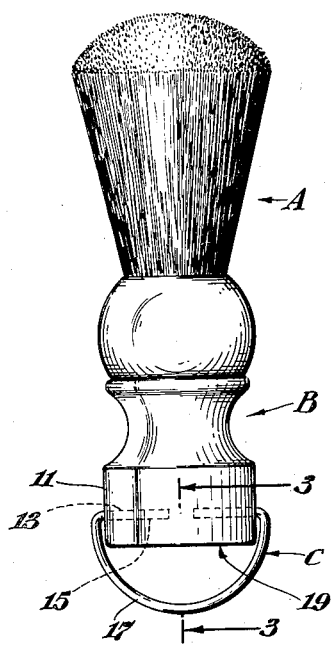
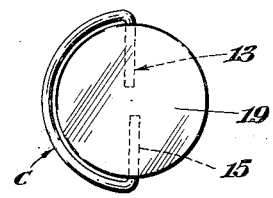
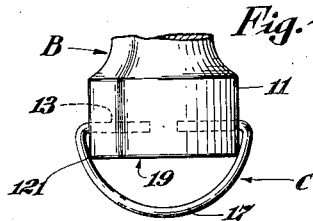
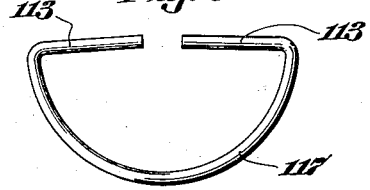
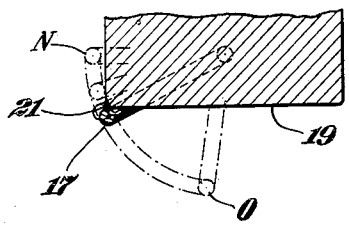
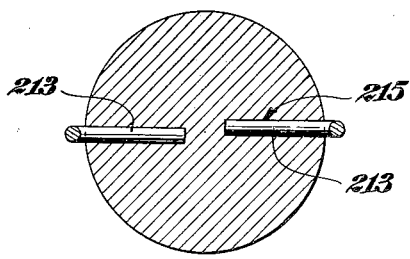
INVENTOR,
Murray Saladow,
BY
ATTORNEY Patented July 24, 1934

1,967,593

UNITED STATES PATENT OFFICE 1,967,593

SHAVING BRUSH

Murray Saladow, Brooklyn, N. Y., assignor to American Safety Razor Corporation, Brooklyn, N. Y., a corporation of Virginia Application November 29, 1932, Serial No. 644,776

6 Claims. (Cl. 248—50)

This invention relates in general to shaving brushes, and more particularly to the provision with a shaving brush of a bail peculiarly effective for such association.

Among the objects of my invention is the provision of material for forming the bail, of such character as to peculiarly adapt itself for association with a brush handle for purposes of forming the bail therefor, and particularly where the brush handle is made of celluloidal material.

Another object is the provision of a bail so contoured and shaped as to serve usefully in association with a shaving brush.

A further object is the provision of a bail so formed and associated with a brush handle and particularly one made of celluloidal or resinous material.

For the attainment of these objects and such other objects as may hereinafter appear or be pointed out, I have illustrated embodiments of my invention in the drawing, wherein:

Figure 1 is an elevational view of the shaving brush with the bail in its operative position;

Figure 2 is a view of the bottom of the brush handle showing the bail in inoperative position;

Figure 3 is a section on line 3—3 of Figure 1, showing the bail in various positions and showing the obstruction that is provided and that must be passed by the bail before it can be moved from the position of use to non-use or vice versa;

Figure 4 is a view of a modified relation between the bail and the handle;

Figure 5 is a detail view of a bail having its ends slightly diverging, in order to obtain frictional contact between the bail and the handle;

Figure 6 shows another way of obtaining frictional contact of the bail and the handle so as to insure the handle remaining in any position of adjustment; and Figure 7 is still another way of obtaining such frictional effect, by modification of the bail.

On referring to Figure 1 it will be observed that I have there illustrated a shaving brush comprising a hair tip A and a handle B. These are more or less of the conventional type, except that the handle B is made of a celluloidal material although it will be understood that the purposes of my invention are attained if only the cylindrical end 11 of the handle is formed of such a material.

Associated with the brush is a bail C made of a rod of celluloidal material. The rod is of a thickness and consistency so as to permit of its being worked into shape and associated with the brush handle in a manner and for the purposes as will be more fully set forth hereinafter.

It will be understood that the term celluloidal as herein employed, is intended to cover, not only celluloid, but also materials that have the characteristics of and can be worked from the rod into bail form, and will cooperate with the brush head as will celluloid, all as will be more fully set forth hereinafter.

The handle of the brush is shown as provided with a cylindrical portion 11, having a flat base 19 and in this cylindrical portion are provided a pair of transverse holes 13, into which are inserted the end portions 15 of the bail C. The bail, as has been stated, is made of resilient material in rod form, and, as shown, is of substantially semi-circular form, its main portion 17 being constructed on a circular arc and the aforementioned end portions 15 being directed inwardly and substantially diametrically with relation to said curved portion. By making the bail of resilient material, it may be inserted into position on the handle after both handle and bail are in their finished form and broken bails may be readily replaced, and the resilient construction will also serve for a purpose that will be explained presently.

On viewing Figure 2, in which the bail is shown in inoperative position, it will be noticed that owing to the cylindrical shape of the handle and the circular shape of the bail, a close fit between the two is attained so that the bail occupies little space and is out of the way when the brush is to be packed away or put into a restricted space for other reasons.

In Figure 4 I have illustrated what happens when the brush is to be brought from its inoperative position illustrated by the dotted lines at N, into its operative position O. In passing from one of these positions to the other, the circular portion of the bail will come in contact with the rim 21 of the base portion 19 of the handle, and in order to pass this rim portion the bail must be flexed or distorted from its normal contour which, of course, is readily accomplished because of the resilient nature of the material of which the bail is made. At the same time, a stop is thereby provided which will normally prevent undesired movement of the bail from one position into the other. When it is desired, for instance, to stand the brush upright on its base, the bail will be positioned at the side of the handle, and the construction just described will assure that the bail stays at the side and does not drop into a downward position so that it will be in the way.

On referring to Figure 4, it will be noted that, as here shown, when the bail is in its operative or extended position, certain portions of its circular portion will engage the rim portions 121 of the base of the brush handle, and by suitably proportioning the bail and the handle, resilient frictional contact may be attained which will tend to keep the handle in this position.

Because of the annoyance of having a bail which is so freely movable that it will change its position in an objectionable manner, I have shown a construction which will provide sufficient friction between the bail and the handle to cause the bail to stay in any position in which it is put. For this purpose I have shown, in Figure 5, the ends 113 of the bail as slightly diverging instead of being aligned diametrically with reference to the circular portion 117. If the holes in the handle are at the same time aligned, it is obvious that because of the lack of alignment between the parts 113 and the holes and because the bail is made of resilient material, there will at all times be resilient frictional pressure against the sides of the holes. Another way of carrying out the same idea is shown in Figure 6, in which the holes 215 are out of alignment, while the end portions 213 of the bail are normally in alignment, and still another way is shown in Figure 7, in which one of the end portions 313 is out of alignment, while its companion and the holes in the handle are in alignment.

While I have described my invention as used in connection with a handle of cylindrical shape and a bail of circular formation, it is obvious that other shapes may be used to embody my invention and attain the various objects thereof.

Having thus described my invention and illustrated its use, what I claim as new and desire to secure by Letters Patent is:

1. In a shaving brush, a handle of substantially cylindrical section, and a movable bail attached thereto, said bail being shaped in a circular arc closely approximating said cylindrical contour, so that in predetermined positions it will closely approximate and merge into said contour so as to project only to a limited extent therefrom and in other predetermined positions it will be obstructed by portions of said cylindrical contour but may be caused to pass thereover and into the position of use by distortion.

2. A shaving brush comprising a handle having a flat end portion whereby the brush may be caused to stand upright, a bail associated therewith and adapted automatically to remain in any position of adjustment and to assume an operative position in which the bail will be positioned over the flat end and prevent the brush from standing thereon, and an inoperative position in which it will be closely adjacent to the handle and away from the flat end so that the brush may be positioned thereon to stand upright, said handle and bail being relatively so contoured that at a point of adjustment of the bail intermediate said operative and inoperative positions they interfere and the bail can only be moved by distorting it.

3. A shaving brush comprising a handle and a resilient bail mounted thereon, said bail and said handle being relatively contoured so that when the bail is in an inoperative position it will merge with the contour of the handle, when it is in an operative position it will be resiliently distorted by portions of the handle to maintain it in position, and at a point intermediate said operative and inoperative positions its adjustment will be obstructed by portions of said handle and can only be effected by distortion of the bail, and auxiliary means for causing said handle at all times to remain in any of its positions of adjustment.

4. A shaving brush comprising a handle and a resilient bail mounted thereon, said bail and said handle being relatively contoured so that when the bail is in an inoperative position it will merge with the contour of the handle when it is in an operative position it will be resiliently distorted by portions of the handle to maintain it in position, and at a pont intermediate said operative and in operative positions its adjustment will be obstructed by portions of said handle and can only be effected by distortion of the bail.

5. A shaving brush comprising a handle and a resilient bail mounted thereon, said bail and said handle being relatively contoured so that when the bail is in an inoperative position it will merge with the contour of the handle, and at a point intermediate its operative and inoperative positions its adjustment will be obstructed by portions of said handle and can only be effected by distortion of the bail.

6. A shaving brush comprising a handle and a resilient bail mounted thereon, said bail and said handle being relatively contoured so that when the bail is in an inoperative position it will merge with the contour of the handle, and at a point intermediate its operative and inoperative positions its adjustment will be obstructed by portions of said handle and can only be effected by distortion of the bail, and auxiliary means for causing said handle at all times to remain in any of its positions of adjustment.

MURRAY SALADOW.